(12) United States Patent
Fujioka (10) Patent No.: US 10,913,406 B2
(45) Date of Patent: Feb. 9, 2021

(54) WIRE PROTECTION PIPE AND WIRE HARNESS

(71) Applicant: SUMITOMO WIRING SYSTEMS, LTD., Yokkaichi (JP)

(72) Inventor: Ryo Fujioka, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/757,660

(22) PCT Filed: Oct. 9, 2018

(86) PCT No.: PCT/JP2018/037556
§ 371 (c)(1),
(2) Date: Apr. 20, 2020

(87) PCT Pub. No.: WO2019/087701
PCT Pub. Date: May 9, 2019

(65) Prior Publication Data
US 2020/0331413 A1 Oct. 22, 2020

(30) Foreign Application Priority Data
Oct. 30, 2017 (JP) ................................ 2017-208718

(51) Int. Cl.
*B60R 16/02* (2006.01)
*H01B 7/24* (2006.01)
(Continued)

(52) U.S. Cl.
CPC ....... *B60R 16/0215* (2013.01); *H01B 7/0045* (2013.01); *H01B 7/184* (2013.01); *H01B 7/24* (2013.01); *H02G 3/04* (2013.01)

(58) Field of Classification Search
CPC . B60R 16/0215; B60R 16/0207; B21D 51/16; H02G 3/04; H02G 3/0481;
(Continued)

(56) References Cited

U.S. PATENT DOCUMENTS

2004/0099427 A1   5/2004  Kihira
2010/0043225 A1*  2/2010  Oga .................... B60R 16/0207
                                                        29/857

(Continued)

FOREIGN PATENT DOCUMENTS

JP    2004-171952 A    6/2004
JP    2013-135500 A    7/2013
JP    2013-243924 A   12/2013

OTHER PUBLICATIONS

Nov. 6, 2018, International Search Report issued in International Patent Application No. PCT/JP2018/037556.

*Primary Examiner* — Steven T Sawyer
(74) *Attorney, Agent, or Firm* — Oliff PLC (57) ABSTRACT

A wire protection pipe through which a wire is to be passed and that is configured to be attached to a vehicle body, the wire protection pipe including: an underfloor configured to be arranged under a floor of the vehicle body; and a flat portion that is provided in the underfloor, the flat portion having a flat shape in a cross section that intersects an axial direction, as a result of a recess being provided on an upper side or a lower side in a state of the under floor being attached to the vehicle body.

6 Claims, 7 Drawing Sheets

(51) Int. Cl.
*H02G 3/04* (2006.01)
*H01B 7/00* (2006.01)
*H01B 7/18* (2006.01)

(58) Field of Classification Search
CPC .......... H02G 3/0487; H02G 3/28; H02G 1/00; H02G 3/0406; H01B 7/0045; H01B 7/184; H01B 7/24; H01R 43/28; Y10T 29/49117; Y10T 29/49174; F16L 9/02
USPC ....................................................... 174/72 R
See application file for complete search history.

(56) References Cited

U.S. PATENT DOCUMENTS

| | | | |
|---|---|---|---|
| 2011/0127084 A1 | 6/2011 | Ichikawa et al. | |
| 2013/0008711 A1* | 1/2013 | Toyama ................. | H02G 3/30 174/70 R |
| 2013/0140054 A1* | 6/2013 | Kato ..................... | H02G 1/00 174/68.3 |
| 2014/0326479 A1* | 11/2014 | Itani .................... | B60R 16/0215 174/68.3 |
| 2016/0101747 A1* | 4/2016 | Inao ..................... | H02G 3/0487 174/72 A |

* cited by examiner

WIRE PROTECTION PIPE AND WIRE HARNESS

BACKGROUND

The present disclosure relates to a wire protection pipe and a wire harness.

It is conventionally known to pass a plurality of wires to be arranged under the floor of a vehicle body through a wire protection pipe to protect the wires, for example (as described in JP 2004-171952A below, for example). Ordinarily, wire protection pipes have a perfect circle shape in a cross section.

SUMMARY

However, in the above-described configuration, the cross-sectional shape of the wire protection pipe is a perfect circle shape, and accordingly the length of the wire protection pipe in the vertical direction is likely to be large. If the length of the wire protection pipe in the vertical direction is large, there is a risk that the wire protection pipe will come into contact with the ground or the like earlier than various reinforcement members that are provided under the floor of the vehicle body to reinforce the vehicle body, for example. If the wire protection pipe comes into contact with the ground or the like and is damaged, e.g., broken, it is difficult to protect wires within the wire protection pipe, and therefore there is demand that measures be taken.

An exemplary aspect of the disclosure provides a wire protection pipe and a wire harness that can be made unlikely to come into contact with the ground or the like.

A wire protection pipe according to the present disclosure is a wire protection pipe through which a wire is to be passed and that is configured to be attached to a vehicle body, and includes an underfloor configured to be arranged under a floor of the vehicle body and a flat portion that is provided in the underfloor. The flat portion has a flat shape in a cross section that intersects an axial direction, as a result of a recess being provided on an upper side or a lower side in a state of the underfloor portion being attached to the vehicle body.

A wire harness according to the present disclosure includes the above-described wire protection pipe and a plurality of wires that are passed through the wire protection pipe.

According to the present disclosure, a height dimension of the flat portion is small, when compared to a height dimension of a portion that has a perfect circle shape in a cross section, and therefore contact with the ground or the like can be made unlikely to happen.

DETAILED DESCRIPTION OF EMBODIMENTS

The following describes preferred aspects of the present disclosure.

The wire protection pipe according to the present disclosure may have a configuration in which a further recessed stepped recess is provided on the recess side of the flat portion. With this configuration, a clamp that is used to attach the wire protection pipe to the vehicle body can be positioned in the axial direction of the pipe as a result of being attached to the stepped recess.

The wire protection pipe according to the present disclosure may include a perfect circular portion that has a perfect circle shape in the cross section and is bent. If the flat portion is bent, there is a risk that the flat portion will collapse, for example, and the cross-sectional shape will not be retained. However, with this configuration, the wire protection pipe can be bent so as to conform to an arrangement route of a wire harness while appropriately retaining the cross-sectional shape of the wire protection pipe.

The wire protection pipe according to the present disclosure may have a configuration in which, in a state of being attached to the vehicle body, a lower end of the flat portion is located higher than a lower end of a reinforcement member that reinforces the vehicle body. With this configuration, the lower end of the flat portion is unlikely to come into contact with the ground or the like earlier than the lower end of the reinforcement member, and it is possible to more reliably make the wire protection pipe unlikely to come into contact with the ground or the like.

Embodiment 1

The following describes one specific embodiment of the present disclosure in detail with reference to FIGS. 1 to 6.

Figure 1:
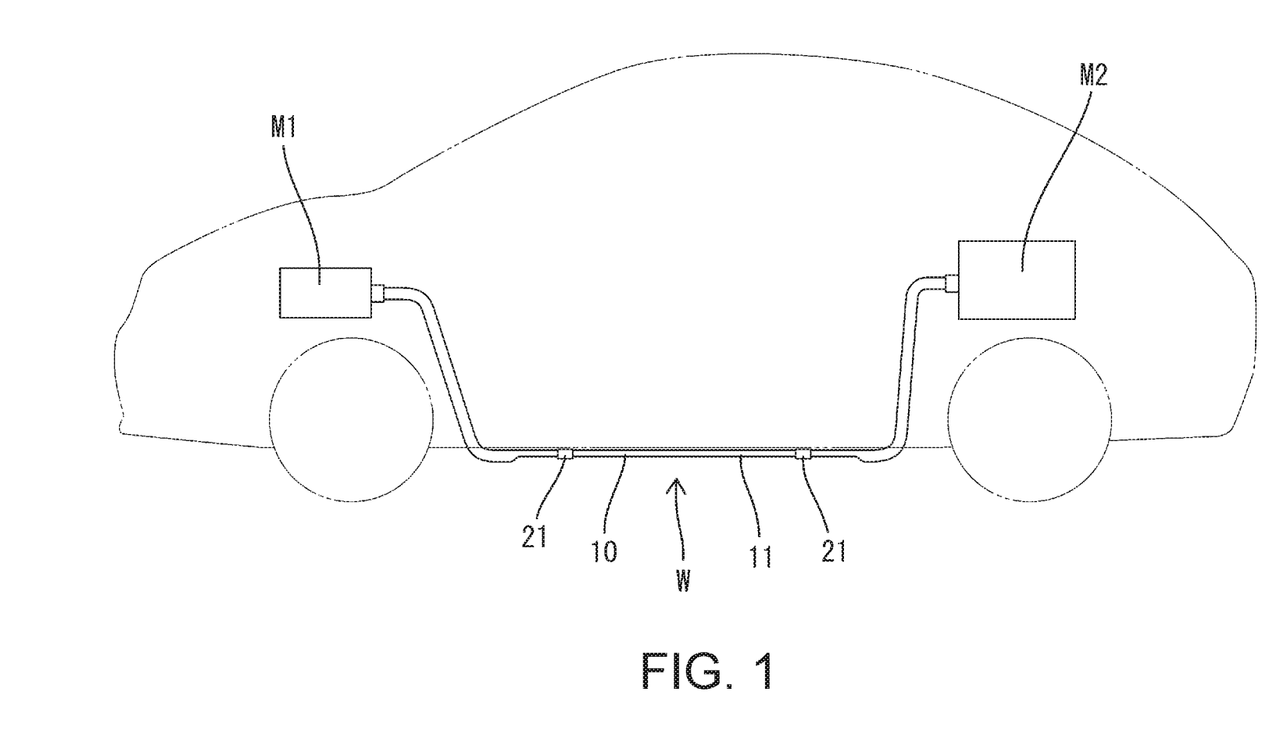
FIG. 1 is a schematic side view showing a wire harness according to Embodiment 1 in a state of being attached to a vehicle body.

A wire harness W in the present embodiment is installed in an electric automobile or a hybrid vehicle. The wire harness W includes a plurality of (two in the present embodiment) wires 20 and a wire protection pipe (hereinafter simply referred to as a "pipe 10") that protects the wires 20. The wire harness W connects a device (a motor, an inverter, etc.) M1 that is installed in a front portion of the vehicle and a device (a high voltage battery etc.) M2 that is installed in a rear portion of the vehicle to each other. The wire harness W spans from the front portion to the rear portion of the vehicle, and has an overall length of about 3 to 4 m. As shown in FIG. 1, a major portion of the wire harness W is arranged under the floor (below a floor panel 30) of the vehicle. In the following description, an upper side of each constitutional member in a state in which the wire harness W is attached to the vehicle body will be referred to as the upper side, and a lower side of each constitutional member in this state will be referred to as the lower side.

Each wire 20 is an ordinary wire that is obtained by covering a flexible conductor (e.g., a twisted wire conductor that is obtained by twisting together a plurality of metal strands) with an insulation covering and does not have a shield function. A terminal fitting (not shown) is connected to an end portion of each wire, and the terminal fitting is housed in a connector that can be connected to a device.

The wire harness W includes shield members (not shown) that surround and shield portions of the wires 20 that are drawn out from the pipe 10. The shield members are braided members that are obtained by braiding fine metal wires into a tubular shape or are pieces of metal tape, for example, and have shield properties and flexibility. Ends on one side of the shield members are respectively connected to opposite end portions of the pipe 10 in an axial direction thereof in a manner that allows for electrical conduction, and ends on the other side of the shield members are connected to connectors. As a result of the overall length of the wires 20 being covered by the pipe 10 and the shield members, electromagnetic noise generated from the wires 20 is blocked.

The pipe 10 surrounds at least portions of the wires 20 that are arranged under the floor, and prevents foreign matter from interfering with the wires 20. The pipe 10 is an elongated tubular body that is made of metal (e.g., copper, a copper alloy, aluminum, or an aluminum alloy), and has shield properties and shape-retaining properties. The pipe 10 is bent (plastically deformed) into a predetermined shape using a bending machine, and retains the predetermined bent shape. The plurality of wires 20 are collectively passed through the pipe 10.

Figure 2:
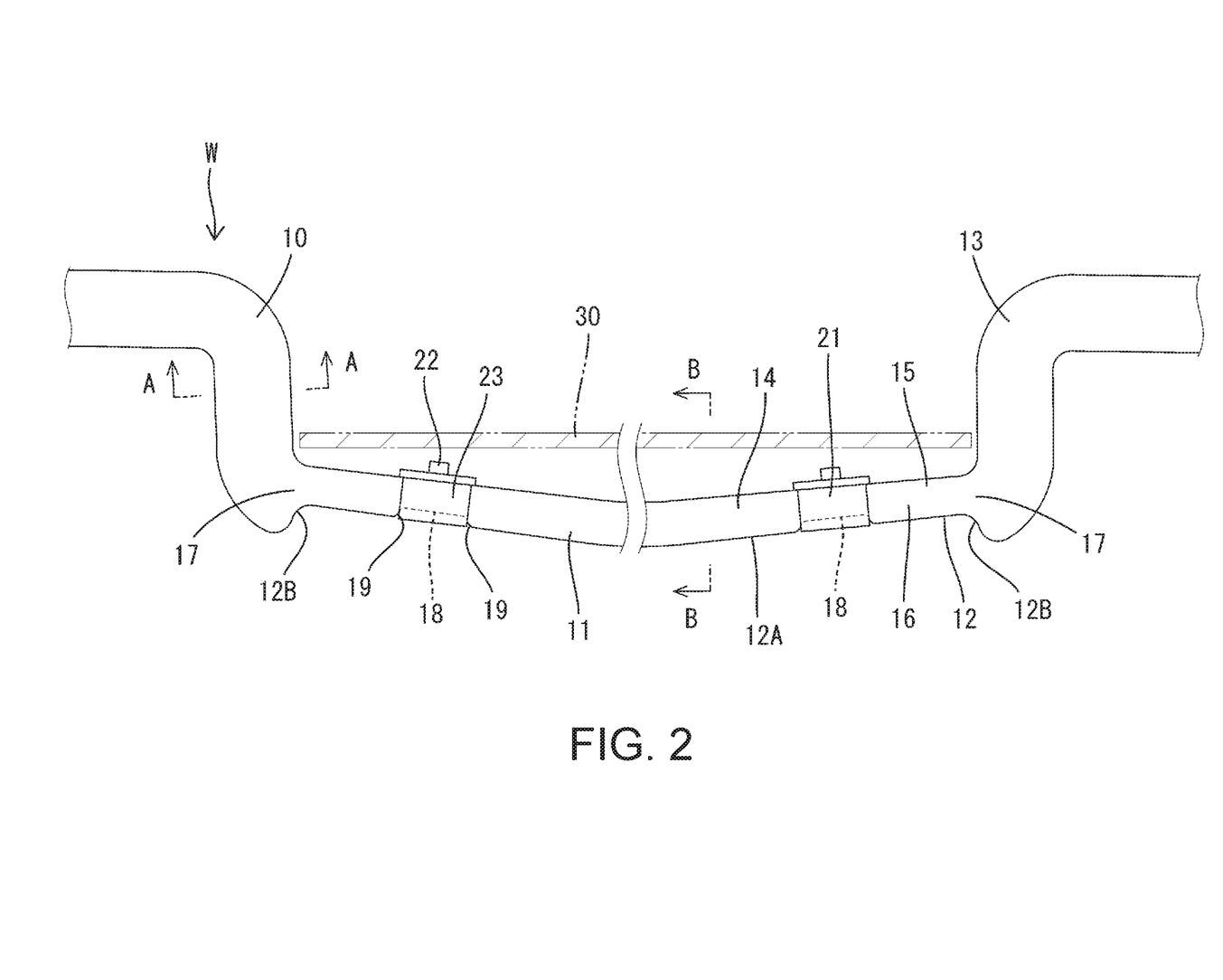
FIG. 2 is an enlarged partial side view showing the wire harness in a state of being attached to the vehicle body.
Figure 3:
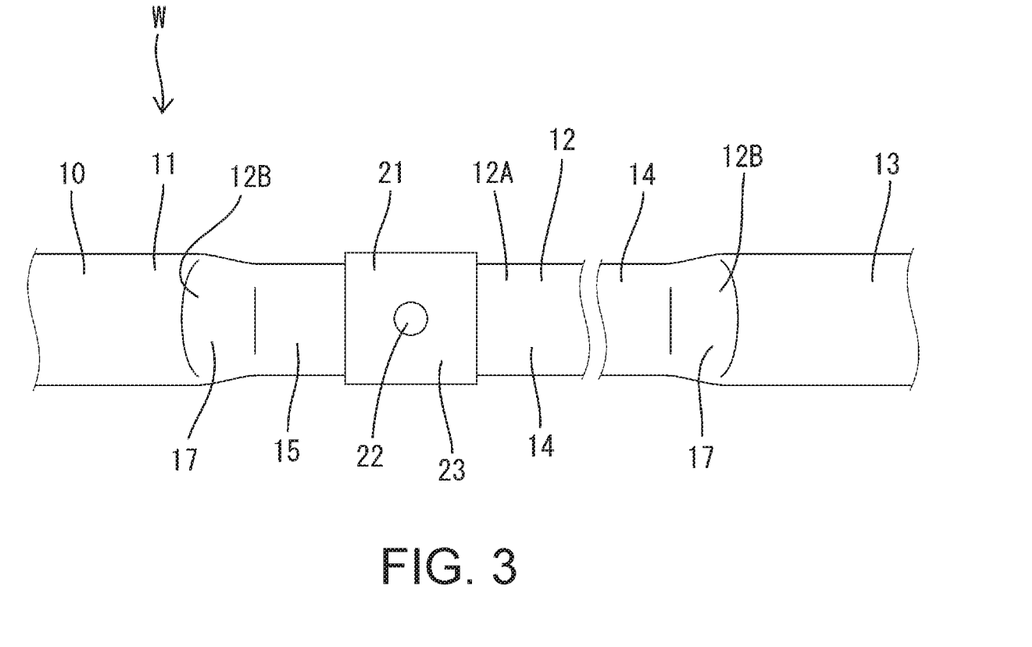
FIG. 3 is an enlarged partial plan view showing an underfloor portion of the wire harness.
Figure 4:
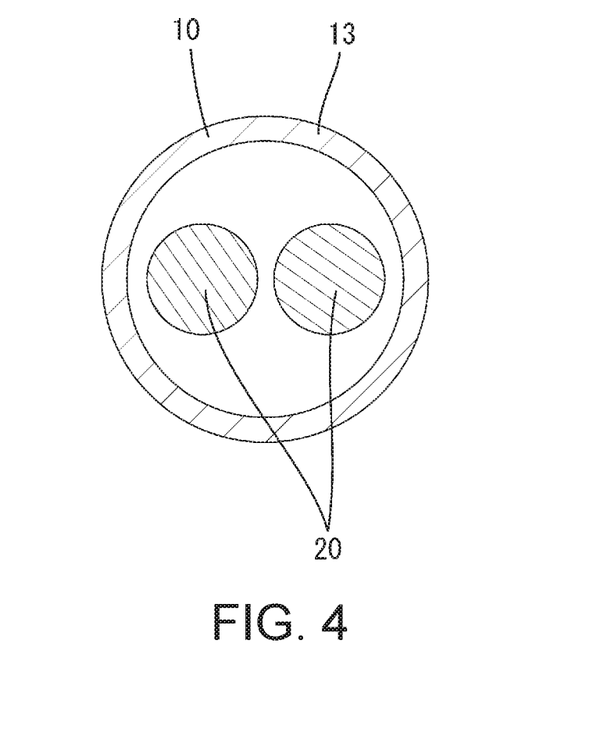
FIG. 4 is a cross-sectional view of the wire harness and shows a cross section at position A-A in FIG. 2.

As shown in FIG. 2, the pipe 10 includes an underfloor portion 11 (underfloor) that is arranged below the floor panel 30 of the vehicle body. The underfloor portion 11 is provided in a major portion of the pipe 10 excluding opposite end portions thereof in the axial direction. The opposite end portions of the pipe 10 (i.e., portions respectively located forward and rearward of the underfloor portion 11) are bent upward in a state of being attached to the vehicle body. Note that, in the present embodiment, the underfloor portion 11 is gradually inclined downward from both ends in the axial direction toward a central portion in a state of being fixed to the vehicle body.

On the lower side of the underfloor portion 11 in a state of being attached to the vehicle body, a recess 12 is provided. The recess 12 is formed by recessing only one side of a cross section that has a perfect circle shape. The recess 12 spans a major portion (in the present embodiment, substantially the entirety) of the underfloor portion 11.

The recess 12 is continuous over a predetermined range (this range can be appropriately changed according to conditions of the vehicle body etc.) in the axial direction of the underfloor portion 11. In the present embodiment, only one continuous recess 12 is provided. The entire recess 12 has a constant length (depth) in the vertical direction. When viewed from a side (a horizontal direction that intersects the axis of the pipe 10), the recess 12 includes a flat surface 12A that extends in the axial direction of the pipe 10 and end surfaces 12B that extend in a radially outward direction of the pipe 10 (downward in the present embodiment) from opposite ends of the flat surface 12A, and has a shape that is open on one side (lower side) in a radial direction of the pipe 10. Portions that are located at intersections between the flat surface 12A and the end surfaces 12B of the recess 12 are curved and round. Portions of the pipe 10 other than the portion in which the recess 12 is formed are left as perfect circular portions 13 that have the shape of a perfect circle (a circle that does not include an ellipse, an elongated circle, etc.) in a cross section.

Figure 5:
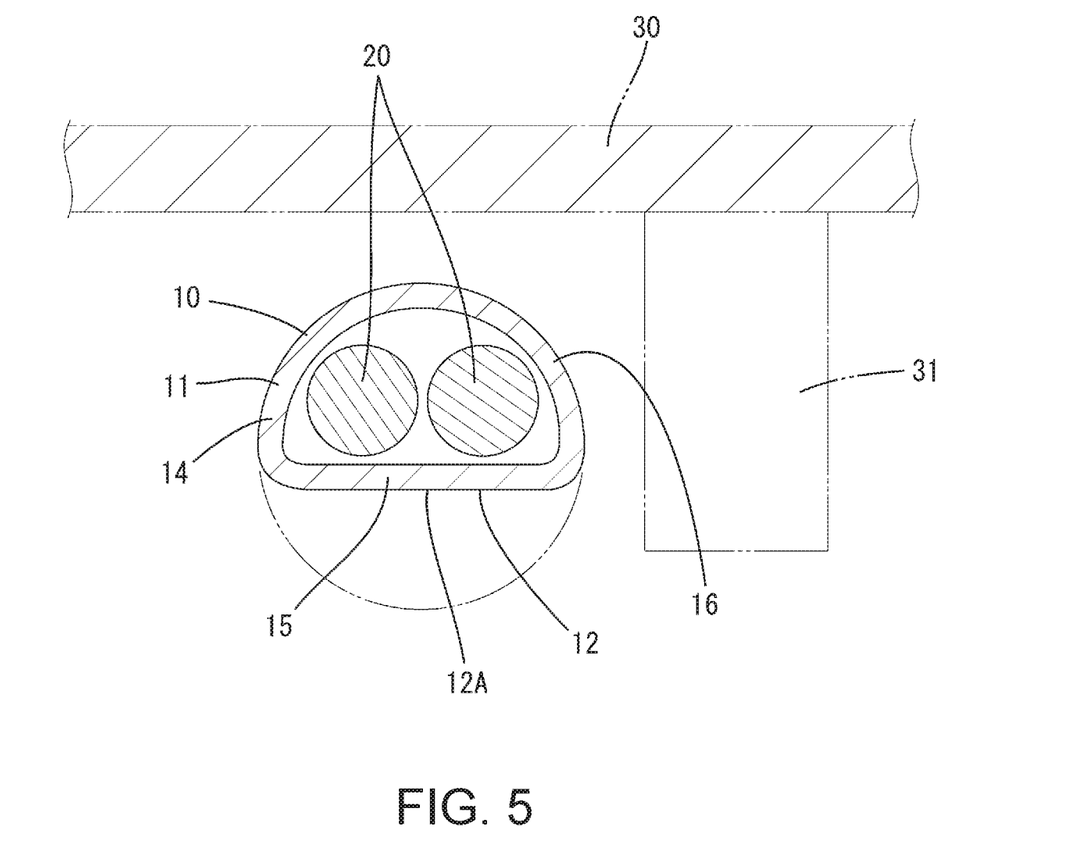
FIG. 5 is a cross-sectional view of the wire harness in a state of being attached to the vehicle body and shows a cross section at position B-B in FIG. 2.

The portion of the underfloor portion 11 in which the recess 12 is formed is a flat portion 14 that has a flat shape in a cross section that intersects the axial direction, as shown in FIG. 5. The width (length in the left-right direction in FIG. 5) of the flat portion 14 is made equal to or slightly larger than the width of the perfect circular portions 13. The cross-sectional shape of the flat portion 14 is elongated in the left-right direction.

The flat portion 14 includes a flat surface portion 15 that is flat and constitutes the recess 12, and a curved surface portion 16 that has an arc shape and is located on the side opposite to the recess 12 with respect to the flat surface portion 15. The flat surface portion 15 is flattened through crushing when the recess 12 is formed. The curved surface portion 16 is a portion in which a portion of the perfect circle shape before the formation of the recess 12 is left uncrushed.

In both end portions (hereinafter referred to as edge portions 17) of the flat portion 14 in the axial direction, the cross-sectional shape gradually gets closer to being a perfect circle from the flat portion 14 side toward the perfect circular portion 13 side. Also, the height dimension (length in the vertical direction) of the edge portions 17 gradually increases from the flat portion 14 side toward the perfect circular portion 13 side. Surfaces (end surfaces 12B) of the edge portions 17 that face the recess 12 are inclined relative to the axial direction of the pipe 10.

Further recessed stepped recesses 18 are provided in the lower surface (flat surface 12A) of the flat portion 14. The stepped recesses 18 are provided at predetermined positions (attachment positions of clamps 21) of the flat portion 14. The stepped recesses 18 are provided at a plurality of positions (two positions in the present embodiment).

Each stepped recess 18 is smaller than the recess 12. The depth (length in the vertical direction) and the length (length in the axial direction) of each stepped recess 18 are small, when respectively compared to the depth and the length of the recess 12. Step portions 19 are formed between the flat surface 12A and both ends of each stepped recess 18 in the axial direction. The step portions 19 position the clamps 21 by abutting against opposite ends of each clamp 21 in the axial direction.

The clamps 21 are attached to the stepped recesses 18. Each clamp 21 is made of a synthetic resin and includes a vehicle-body fixing portion 22 to be fixed to the vehicle body and a pipe fixing portion 23 to be fixed to the pipe 10, which are formed as a single piece.

Next, one example of a manufacturing method of the wire harness W in the present embodiment will be described.

First, the wires 20 are passed through a conventional pipe (hereinafter referred to as a "round pipe P"), the entirety of which has a perfect circle shape. Note that the wires 20 are omitted in FIG. 6.

Figure 6:
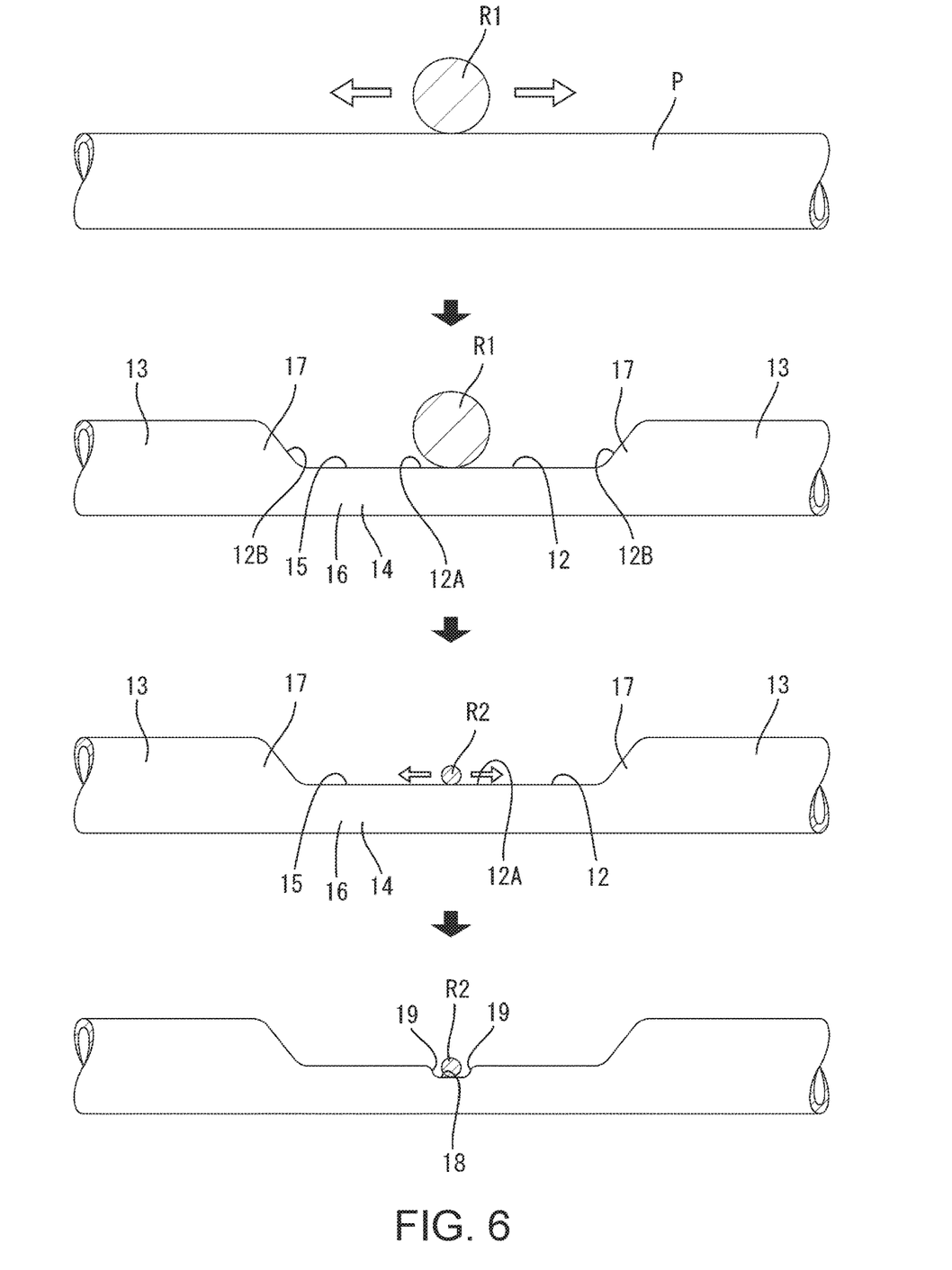
FIG. 6 is a schematic diagram showing a manufacturing process of a wire protection pipe.

Then, the recess 12 is formed in the round pipe P. As shown in FIG. 6, the recess 12 is formed by pressing one side of the round pipe P using a pressure roller R1. The pressure roller R1 is placed on the one side of the round pipe P, and pressure is gradually applied while driving the pressure roller R1 to roll over a predetermined range in the axial direction of the round pipe P. The round pipe P is sandwiched between the pressure roller R1 and a receiving member (not shown) that is located opposite to the pressure roller R1, and is gradually crushed into a flat shape under the pressure applied from the pressure roller R1. The flat surface 12A is formed in the driving range of the pressure roller R1, and the end surfaces 12B that are continuous to the flat surface 12A and gently curved following the outer circumferential surface of the pressure roller R1 are formed in opposite end portions of the flat surface 12A. At this time, as a result of the pressure being gradually applied from the pressure roller R1, damage, such as buckling of the round pipe P during processing, in particular, buckling of the edge portions 17 located on boundaries of the perfect circular portions 13 can be prevented.

As a result of the recess 12 being formed in the predetermined range of the round pipe P as described above, the pipe 10 including the flat portion 14 formed in the predetermined range is obtained.

Next, the stepped recesses 18 are formed. The stepped recesses 18 are formed using a roller (hereinafter referred to as a "small roller R2") that is smaller than the pressure roller R1. Each stepped recess 18 is formed by placing the small roller R2 at a predetermined position on the flat surface portion 15 and gradually applying pressure while driving the small roller R2 to roll in the axial direction over a range to which the clamp 21 is to be fitted. Similarly to the recess 12, the step portions 19 that are gently curved and raised are formed in opposite end portions of each stepped recess 18 in the axial direction.

Next, the pipe 10 is bent. The pipe 10 is bent using a bending machine so as to conform to an arrangement route of the wires 20. Here, if the flat portion 14 is bent, there is a risk that the pipe 10 will be damaged at the bent portion. For example, if the flat portion 14 is bent in the vertical direction (the short axis direction in a cross section), there is a risk that the cross section will collapse in the bent portion and the wires 20 within the flat portion 14 will be pressed. Alternatively, if the flat portion 14 is bent in the left-right direction (the long axis direction in a cross section), there is a risk that the pipe 10 will be damaged as a result of the flat surface portion 15 buckling, for example. However, the pipe 10 according to the present embodiment includes the perfect circular portions 13 that are left as portions to be bent, and therefore the pipe 10 can be favorably bent by bending the perfect circular portions 13.

Next, the clamps 21 are attached to the stepped recesses 18. As a result of the clamps 21 being fitted to the stepped recesses 18, both end portions of each clamp 21 in the axial direction are positioned by the step portions 19.

Thus, operations for manufacturing the wire harness W are completed.

Next, functions and effects of the embodiment having the above-described configuration will be described.

The wire harness W according to the present embodiment includes the pipe 10 through which the wires 20 are passed and that is configured to be attached to the vehicle body, and the pipe 10 includes the underfloor portion 11 configured to be arranged under the floor of the vehicle body. As a result of the recess 12 being provided on the lower side of the underfloor portion 11 in a state of being attached to the vehicle body, the underfloor portion 11 is provided with the flat portion 14 that has a flat shape in a cross section that intersects the axial direction. With this configuration, contact with the ground or the like can be made unlikely to happen because the height dimension of the flat portion 14 is small, when compared to the height dimension of a portion that has a perfect circle shape.

For example, in a conventional pipe that has a perfect circle shape, the lower end of the pipe may be located closer to the ground or the like than the lower end of a reinforcement member (e.g., a cross member) 31 arranged under the floor is, as shown in FIG. 5. In such a case, the pipe is likely to come into contact with the ground, a curbstone, etc. earlier than any other members in the event of collision, and if the pipe comes into contact with the ground or the like, the pipe may be damaged, e.g., broken, and unable to protect wires within the pipe. However, in the present embodiment, the height dimension of the pipe 10 is reduced by forming the recess 12, and accordingly the lower end of the pipe 10 can be located higher than the lower end of the reinforcement member 31. Thus, the pipe 10 can be made unlikely to come into contact with the ground or the like, and consequently the wires within the pipe 10 can be reliably protected.

Furthermore, the pipe 10 includes the further recessed stepped recesses 18 provided on the recess 12 side of the flat portion 14. With this configuration, the clamps 21 used to attach the pipe 10 to the vehicle body can be positioned in the axial direction of the pipe 10 as a result of being attached to the stepped recesses 18.

Furthermore, the pipe 10 includes the perfect circular portions 13 having a perfect circle shape in a cross section, and the perfect circular portions 13 are bent. If the flat portion 14 is bent, there is a risk that the flat portion 14 will collapse, for example, and not retain the cross-sectional shape. However, with this configuration, the pipe 10 can be bent so as to conform to an arrangement route of the wire harness W while appropriately retaining the cross-sectional shape of the pipe 10.

Furthermore, in a state in which the wire harness W is attached to the vehicle body, the lower end of the flat portion 14 is located higher than the lower end of the reinforcement member 31 that reinforces the vehicle body. With this configuration, the lower end of the flat portion 14 is unlikely to come into contact with the ground or the like earlier than the lower end of the reinforcement member 31, and therefore it is possible to more reliably make the pipe 10 unlikely to come into contact with the ground or the like.

Embodiment 2

Next, a wire harness 40 according to Embodiment 2, which is another specific embodiment of the present disclosure, will be described with reference to FIGS. 7 and 8.

The wire harness 40 according to the present embodiment differs from Embodiment 1 in that the recess 12 is provided on the upper side in a state in which the wire harness 40 is attached to the vehicle body. Note that the same configurations as those in Embodiment 1 are denoted using the same reference numerals as those used in Embodiment 1 and a redundant description thereof is omitted.

Similarly to Embodiment 1, the wire harness 40 according to the present embodiment includes a wire protection pipe (hereinafter simply referred to as a "pipe 41") through which the wires 20 are passed and that is configured to be attached to the vehicle body, the pipe 41 includes an underfloor portion 42 that is configured to be arranged under the floor of the vehicle body, and the underfloor portion 42 is provided with the flat portion 14 that has a flat shape in a cross section that intersects the axial direction, as a result of the recess 12 being formed in the underfloor portion 42. Also, similarly to Embodiment 1, the pipe 41 includes the perfect circular portions 13 that have a perfect circle shape in a cross section, and the perfect circular portions 13 are bent. Similarly to Embodiment 1, the further recessed stepped recesses 18 are provided in the flat surface portion 15 of the flat portion 14, and the clamps 21 are fixed to the stepped recesses 18.

The wire harness 40 according to the present embodiment is manufactured using substantially the same method as that used in Embodiment 1.

Figure 7:
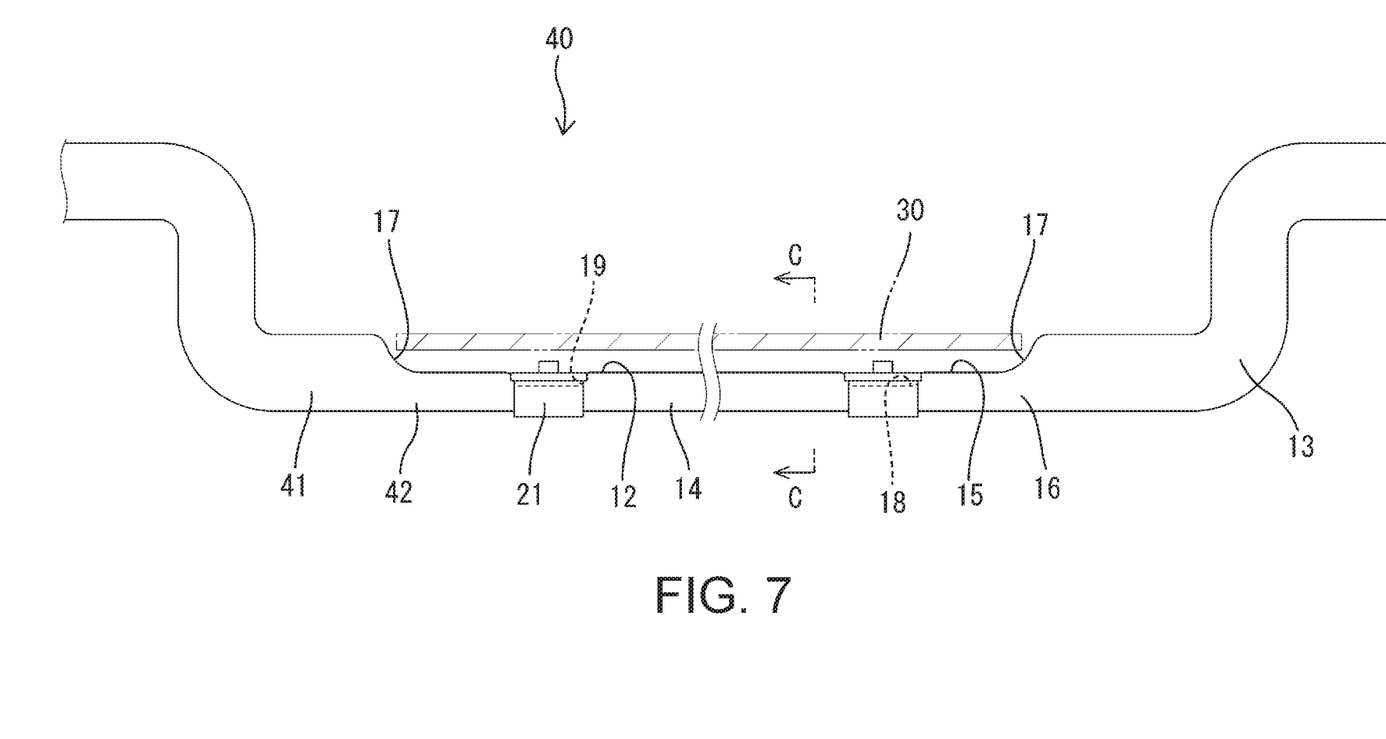
FIG. 7 is an enlarged partial side view showing a wire harness according to Embodiment 2 in a state of being attached to a vehicle body.
Figure 8:
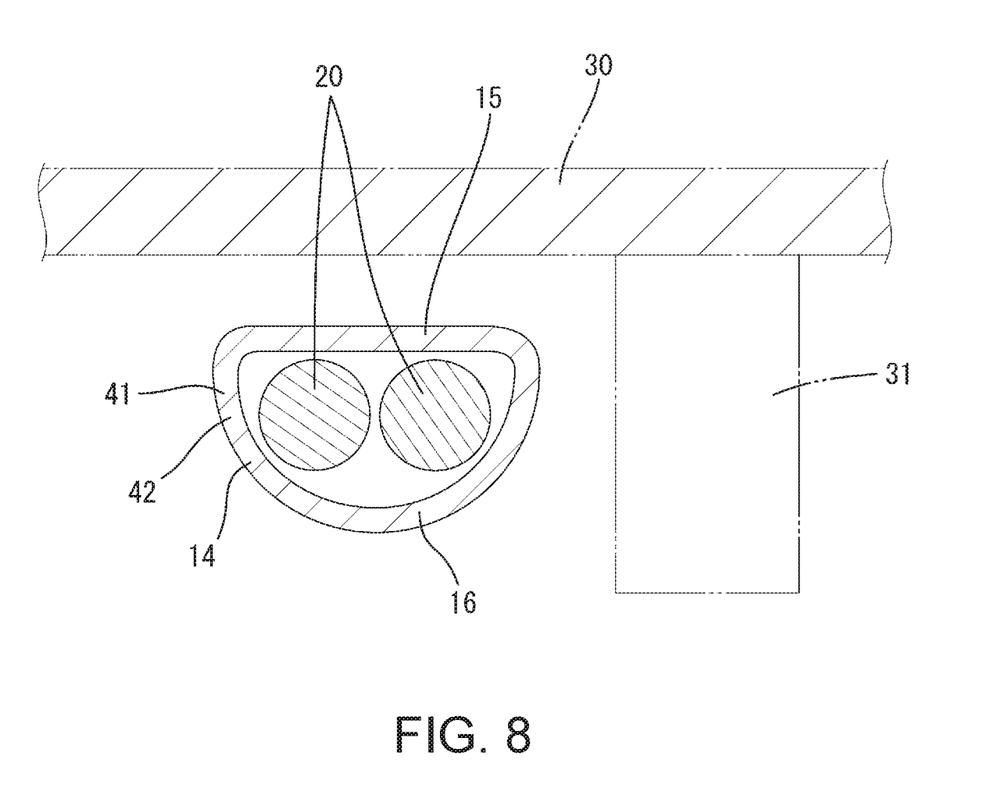
FIG. 8 is a cross-sectional view of the wire harness in a state of being attached to the vehicle body and shows a cross section at position C-C in FIG. 7.

As shown in FIGS. 7 and 8, in a state in which the wire harness 40 according to the present embodiment is attached to the vehicle body, the flat portion 14 of the pipe 41 is arranged along the lower surface of the floor panel 30, and the lower end of the flat portion 14 is located higher than the lower end of the reinforcement member (e.g., a cross member) 31 used to reinforce the vehicle body.

In the present embodiment, the flat surface portion 15 of the flat portion 14 is arranged on the upper side, and the curved surface portion 16 of the flat portion 14 is arranged on the lower side. The flat surface portion 15 is substantially parallel to the floor panel 30 and can be arranged close to the floor panel 30. On the other hand, the curved surface portion 16 is arranged on the lower side, and this is advantageous in terms of being located away from the ground, when compared to a case in which the flat surface portion 15 is arranged on the lower side. That is, the entire flat surface portion 15 is located at a constant distance from the ground, but curved portions of the curved surface portion 16 are located farther away from the ground, when compared to the lower end of the curved surface portion 16.

As described above, the wire harness 40 according to the present embodiment includes the pipe 41 through which the wires 20 are passed and that is configured to be attached to the vehicle body, the pipe 41 includes the underfloor portion 42 configured to be arranged under the floor of the vehicle body, and the underfloor portion 42 is provided with the flat portion 14 that has a flat shape in a cross section that intersects the axial direction, as a result of the recess 12 being provided on the upper side of the underfloor portion 42 in a state of being attached to the vehicle body. Accordingly, similarly to Embodiment 1, the height dimension of the flat portion 14 is small, when compared to the height dimension of a portion that has a perfect circle shape, and therefore contact with the ground or the like can be made unlikely to happen.

Other Embodiments

The present disclosure is not limited to the embodiments described above with reference to the drawings and, for example, the following embodiments are also included in the technical scope of the present disclosure.

(1) In the above-described embodiments, the pipe 10 (41) is made of metal, but there is no limitation thereto, and the pipe may be made of a synthetic resin or have a structure in which metal foil is concentrically embedded in a resin pipe, for example.

(2) In the above-described embodiments, the stepped recesses 18 are provided in the flat portion 14, but the stepped recesses do not necessarily have to be provided, and a configuration is also possible in which the stepped recesses are provided in the perfect circular portions.

(3) In the above-described embodiments, only one continuous recess 12 is formed in the pipe 10 (41), but there is no limitation thereto, and a plurality of recesses may be formed in the pipe.

(4) In the above-described embodiments, the pipe 10 is bent after the recess 12 and the stepped recesses 18 are formed, but there is no limitation thereto, and the pipe may be bent before the recess and the stepped recesses are formed.

The invention claimed is:

1. A wire protection pipe through which a wire is to be passed and that is configured to be attached to a vehicle body, the wire protection pipe comprising:
   an underfloor configured to be arranged under a floor of the vehicle body;
   a flat portion that is provided in the underfloor, the flat portion having a flat shape in a cross section that intersects an axial direction, as a result of a recess being provided on an upper side or a lower side in a state of the underfloor being attached to the vehicle body, the flat portion including a flat surface formed by the recess and a curved surface that is arranged on an opposite side of the flat surface in a radial direction of the pipe, the curved surface having an arc shape extending in a circumferential direction from a first edge of the flat surface to a second edge of the flat surface that is opposite to the first edge such that the curved surface does not include a recess; and
   a further recessed stepped recess that is provided on a flat surface side of the flat portion and is configured to receive a clamp for attachment to the vehicle body.

2. The wire protection pipe according to claim 1, further comprising
   a perfect circular portion that is connected to the flat portion and that has a perfect circle shape in a cross section and is bent.

3. The wire protection pipe according to claim 1,
   wherein, in a state in which the wire protection pipe is attached to the vehicle body, a lower end of the flat portion is located higher than a lower end of a reinforcement that reinforces the vehicle body.

4. A wire harness comprising:
   the wire protection pipe according to claim 1; and
   a plurality of wires that are passed through the wire protection pipe.

5. The wire protection pipe according to claim 1, wherein the further recessed step recess includes step portions that are configured to abut against opposite ends of the clamp in the axial direction.

6. The wire protection pipe according to claim 1, wherein the further recessed step recess has a depth and a length that is smaller than a depth and a length of the recess.

* * * * *